(12) United States Patent
Rosten et al.

(10) Patent No.: US 8,479,841 B2
(45) Date of Patent: Jul. 9, 2013

(54) ASSEMBLY FOR DRILLING AND LOGGING, METHOD FOR DRILLING AND LOGGING AND DEVICE FOR ELECTRO PULSE DRILLING

(75) Inventors: Tage Rosten, Trondheim (NO); Trond Bolas, Sandnes (NO)

(73) Assignee: Statoilhydro ASA, Stavanger (NO)

( * ) Notice: Subject to any disclaimer, the term of this patent is extended or adjusted under 35 U.S.C. 154(b) by 143 days.

(21) Appl. No.: 12/526,574

(22) PCT Filed: Feb. 7, 2008

(86) PCT No.: PCT/NO2008/000042
§ 371 (c)(1),
(2), (4) Date: Nov. 9, 2009

(87) PCT Pub. No.: WO2008/097101
PCT Pub. Date: Aug. 14, 2008

(65) Prior Publication Data
US 2010/0212962 A1 Aug. 26, 2010

(30) Foreign Application Priority Data
Feb. 9, 2007 (NO) .................................... 20070769

(51) Int. Cl.
*E21B 7/15* (2006.01)
*E21B 47/00* (2006.01)

(52) U.S. Cl.
USPC ................................. 175/16; 175/40; 175/50

(58) Field of Classification Search
USPC ........................................ 175/40, 16, 41, 50
See application file for complete search history.

(56) References Cited

U.S. PATENT DOCUMENTS

| | | | | |
|---|---|---|---|---|
| 3,853,185 A | * | 12/1974 | Dahl et al. ................. | 340/853.4 |
| 7,347,280 B2 | * | 3/2008 | Brune et al. .................... | 175/45 |
| 2005/0150688 A1 | * | 7/2005 | MacGregor et al. ............ | 175/16 |
| 2007/0294036 A1 | * | 12/2007 | Strack et al. .................... | 702/14 |
| 2008/0245568 A1 | * | 10/2008 | Jeffryes .......................... | 175/16 |

* cited by examiner

*Primary Examiner* — Brad Harcourt
(74) *Attorney, Agent, or Firm* — Wenderoth, Lind & Ponack, LLP

(57) ABSTRACT

An assembly for drilling and logging includes a device for electro pulse drilling (EPD device), at least one device to receive acoustic signals generated by the EPD device, distinguished in that the assembly further includes at least one device to receive electromagnetic signals generated by the EPD device. A method for drilling and logging, and device for electro pulse drilling.

23 Claims, 3 Drawing Sheets

ASSEMBLY FOR DRILLING AND LOGGING, METHOD FOR DRILLING AND LOGGING AND DEVICE FOR ELECTRO PULSE DRILLING

BACKGROUND OF THE INVENTION

I. Technical Field

The present invention relates to drilling and logging, particularly for exploiting hydrocarbons from underground formations.

More specifically, the present invention relates to an assembly for drilling and logging, a method for drilling and logging and a device for electro pulse drilling particularly feasible for working the method.

II. Description of the Related Art

Most deposits of gas and/or liquid hydrocarbons are found hidden inside the underground in strata of rock sediments. Drilling into the underground to be able to produce hydrocarbon fluids from a hydrocarbon-containing formation is very costly. To increase the possibility for the well to hit a hydrocarbon containing reservoir, the underground is mapped as much as possible before drilling. Seismic techniques, and to a lesser extent electromagnetic techniques are used for the mapping.

But also during drilling there is significant interest in having information on the underground in order to be able to better plan and control the drilling operation so that assumed or identified hydrocarbon reservoirs can be produced. Advantageously, the information is as detailed and correct as possible, for improved planning and control of the drilling operation.

Drilling is usually performed with a drill string that is rotated from the surface. An alternative method is to use a down-hole motor near the drilling bit, for rotation thereof. The motor can, for example, be driven by the circulating drilling mud.

A third method for drilling is electro pulse drilling, so-called EPD-Electro Pulse Drilling. When electro pulse drilling, powerful electric pulses are used to break up the formation, instead of a pure mechanical treatment as used by the traditional drilling processes. More specifically, at least two electrodes that are separated with an insulating material are used, one electrode being charged to a high electrical potential, while the other electrode is grounded. At sufficiently high charging, a powerful spark will be formed as the electrodes are short-circuited by the current going the way of lowest resistance from the charged electrode to the grounded electrode. A drill bit for electro pulse drilling comprises at least the two types of electrodes, in different configurations, and may in addition comprise one or several additional electrodes that during operation will take potential between the electrodes, so-called floating electrodes. There is a requirement for high voltage, typically several kilovolts, and high current to deliver sufficient energy to break up the formation ahead of the drilling bit where the electrodes are arranged. To have sufficient effect, at power-full electric supply is required, typically comprising a number of elements for charging and subsequent discharging of the electrical energy, which elements typically are in the form of condensers. Dependent on the formation and the operational parameters, the electrical spark will form a pressure wave in the drilling fluid ahead of the drilling bit, or form a plasma channel in or at the formation, in both circumstances resulting in breaking up of the formation.

Electro pulse drilling is described in several patent applications, of which three to are described below.

In patent publication U.S. Pat. No. 4,741,405 a device is described for focused electro pulse drilling, comprising multiple electrodes. The drill bit includes at least a first electrode that is positively coupled to a pulse-forming line, a second electrode that is coupled to the ground potential, and a number of third electrodes that are arranged near the first and the second electrode, the third electrodes being floating electrodes. By charging the first electrode, at the correct conditions a spark will be formed between the first electrode and one of the third electrodes, further to a next of the third electrodes, until the spark finally goes over to the grounded second electrode. The drill bit is against the formation surrounded by a working fluid, and the sparks form a pressure wave in the working fluid directed at the material to be drilled out. It is assumed that in the working fluid plasma channels are formed, resulting in pressure waves, which again have sufficient energy to break down the material to be drilled out. By a sophisticated switched coupling of the pulse-forming lines between an electric supply and selected first electrodes in the drill bit, a focusing of the pressure wave can be achieved, such that the drill can be controlled and directed. The high-voltage power can be delivered to the pulse-forming lines either down-hole or from the surface. A number of means to this end are described, amongst them use of a Marx-generator as high-voltage source. Further, it is described for example in column 4, lines 32-46 that the electro pulse drill as such can be used as a source for seismic impulses to determine the position of the drilling bit and thereby the position of the well-bore. More specifically, pressure waves generated by the drill bit are used as seismic impulses that can be received by a network of seismic receival units positioned on the surface close to the well-bore. Seismic time-distance data can be real-time processed, and a continuous presentation of the well-bore position and deviations from a normal can be projected by use of a dedicated unit. The deviations can then be used to correct and direct the drilling device by generating control signals from the surface. In the patent publication there is only a short description of seismic time/distance analysis to determine the position, nothing is mentioned about mapping formation properties based on the received seismic data or other data.

In patent publication RU 2167991 C2 electro pulse drilling is described in the form of rotational drilling with a mechanical tool, with high-voltage electric pulses traveling over the bottom of the well-bore to reduce the formation strength. Thereby more effective drilling is achieved.

In patent publication WO 03/069110 A1 electro pulse drilling is described in the form of plasma channel drilling. More specifically, an apparatus and a method are described, using a pulsed high-voltage generator coupled to an electrode assembly placed at a material removal station for the apparatus, which means down into a well-bore, the apparatus being adapted to generate electrical pulses to form a plasma channel repetitively per second within or on a surface of a material, so that material is removed by rapid expansion of each plasma channel that fractures and fragments the material body. 1-100 pulses per second are used, typically 5-25 pulses per second, lasting 1-50 micro seconds, and rise time below 150, typically below 100 nanoseconds, with high-voltage in the range 10-50 kV and effect with top value 1-100 MW. Voltage is limited is to about 50 kV to avoid too comprehensive requirements as to insulation. Holes can be drilled with diameters up to 100 mm. Drilling in a "dry" well-bore is also possible, see page 6, line 22, but preferably a drilling fluid of low electric conductivity is used, such as water, which is preferable for removal of fragments. The electrodes are concentrically arranged, with ground outermost. The publication provides a good and comprehensive description of physical parameters in connection with electro pulse drilling. The significance of the dielectrical properties of fluid and formation ahead the drilling bit is described relative to different operating parameters. Inter alia, it is described that at relative high voltage, the electrical break-down will take place in the formation instead of in fluid surrounding the drilling bit. The FIGS. 6 and 7 illustrate break-down of the insulating dielectricum (either the formation that is drilled out or fluid surrounding the drilling bit) as function of voltage or voltage field, and time for discharging. Likewise, the significance of distance between the electrodes is illustrated and described. On page 16, lines 7-21, for operating parameters resulting in the electrical break-down in the formation instead of in a fluid, it is explained how the plasma channels gradually will break down the formation over the whole area of the drilling bit in the direction of drilling, because the plasma channel seeks to go the way of lowest resistance, which way thereby will be the formation. The plasma channel formation will over time rotate 360° around the drilling bit face, whereby material ahead of the full drilling bit is broken down and there is no need to rotate the drill bit with electrodes per se. Further, it is described that the pulse generator preferably can generate a high-voltage pulse with a wave-form near the critical damped response from the circuit formed when the plasma channel is produced. Formation of a plasma channel results in break-down of the dielectrical resistance, why next plasma channel formation should wait until the dielectrical resistance is reestablished. In the publication there is no discussion of electro pulse drilling and simultaneous logging of any kind.

Measurement while drilling, MWD, means to collect data on pressure, temperature and path of drilling in three dimensions during or in connection with drilling. Measurements while drilling to map the formation itself is usually termed logging-while drilling, LWD, which includes measurement of parameters as resistance, porosity, acoustic velocity and gamma radiation. In Patent Publication U.S. Pat. No. 5,881, 310 a closer description of LWD and MDW is found. In said publication it is described that the drilling string and drill bit can be used as a source for acoustic signals, but electro pulse drilling is not mentioned.

In Patent Publication WO 2004/083898 A1 a method and an apparatus are described for determining the properties of underground reservoirs by using an electromagnetic transmitter and a seismic transmitter with in substance identical location on the ground or seabed, which transmitters generate signals that are received by an electromagnetic receiver and a seismic receiver, said receivers having in substance identical location on the ground or seabed, separated from the transmitters. Preferably low acoustic and electro magnetic frequencies are used, in the range 0.1 to 20 Hz, to have reach. By analyzing and comparing different components of electromagnetic field and acoustic response, particularly refracted components, data indicating presence of a hydrocarbon reservoir can be identified and analyzed.

In Patent Application WO 02/14906 A1 a method and an apparatus is described for determining properties of underground reservoirs. An electromagnetic field is applied from the seabed by use of a dipole antenna-transmitter, which field is detected by using a dipole antenna-receiver. Measurements are taken with the antenna-receiver both in-line and parallel and the difference between the two sets of measurements give indication of interest. Dependent on the angle of incidence and state of polarization an incident electromagnetic wave to a layer of high resistance may excite a ducted or guided wave mode in the layer. Such high-resistive layer can be a hydrocarbon-containing layer. The ducted wave modus propagate laterally along the layer and leaks energy back to the overburden and receivers positioned on the seabed. The ducted wave-modus is excited only for an incident wave with transverse magnetic (TM) polarization, which means magnetic field perpendicular to plane of incident, and at angles of incidence close to the Brewster angle and the critical angle (the angle of total reflection). For electromagnetic waves with transverse electric polarization (TE) the ducted mode will not be excited. The transmitter generates both TE and TM waves, but by varying the orientation of the transmitter, optionally using orthogonally oriented receiver antennas, the two modes of waves can be received at different sensitivity.

The above-mentioned methods for mapping the underground are comprehensive and expensive. Often the signals are noisy due to interference and interaction, inter alia, with other sources, long path of the signal, and problems with weak contact with the seabed and disturbing effects of surrounding seawater. There is a demand for better technology for logging, particularly at simultaneous drilling, and particularly so that comprehensive quantities of data of preferably independent data can be collected. There is also demand for a device for electro pulse drilling that is particularly feasible for simultaneous electro pulse drilling and generation of signals for logging.

The objective of the present invention is to meet the above demands.

SUMMARY OF THE INVENTION

With the present invention an assembly for drilling and logging is provided, comprising a device for electro pulse drilling (EPD device) and at least one device for receiving acoustic signals generated by the EPD device, distinguished in that the assembly further comprises at least one device for receiving electromagnetic signals generated by the EPD device. With acoustic signal is meant any type of elastic or seismic signal generated by the EPD device. By electromagnetic signals is meant any type of electric, electromagnetic and magnetic signals generated by the EPD device.

With a device for electro pulse drilling is meant any device for electro pulse drilling, for example those introductorily described, but more preferably a device for electro pulse drilling in accordance with the present invention, which will be further described below. The devices to receive acoustic and electromagnetic signals respectively, generated by the EPD device are of any previously known type, and with placement feasible to receive said signals.

The assembly according to the invention preferably comprises acoustic receivers measuring three displacement vectors and one pressure component, the receivers being arranged in one or more positions chosen amongst: on a seabed, on a ground surface, in water over the seabed, in one or more separate well-bores, in the well-bore where the EPD device is used. Thereby the shear and pressure components of the acoustic waves can be determined. Conveniently, three-axial piezoelectric receivers, hydrophones and geophones can be used.

The assembly according to the invention preferably comprises electromagnetic receivers, arranged in one or more positions chosen amongst: on a seabed, on a ground surface, in water above the seabed, in one or more separate well-bores, in the well-bore where the EPD device is used. With the term electromagnetic receiver is meant electric field receivers, electromagnetic receivers and magnetic field receivers. Electric field receivers comprise for example different types of electrode antennas, such as silver-silver-chloride-, carbon-filled electrodes, fiber optic sensors, dipole antennas and dielectric plate antennas. Electromagnetic receivers comprise for example ring antennas and coils with or without ferromagnetic core, and induction coil magneto-meters. Magnetic field receivers can be divided into two main groups: 1) magneto-meters for H<1 mT and 2) Gauss meters for H>1 mT. Magnetometers can be divided into two subgroups: a) vector, for example search coil, fluxgate, squid, magneto-resistive and fiber optic magnetometers, and b) scalar, for example optic pumped and proton precision magnetometers. Gauss meters are for example Hall effect-magneto-resistive, magneto-diode, and magneto-transistor Gauss meters. The receivers can preferably be arranged in pairs and three and three to measure all components of the electromagnetic field. Most preferred are silver-silver-chloride dipole electrodes or coils with ferromagnetic core for measurement of electric and magnetic field strength on the surface, respectively, because of simple production, low cost and good measurements. I well-bores ring antennas, such as loop antennas or circular antennas are most preferred for electromagnetic measurement, for corresponding reasons. The above-mentioned receivers are preferably placed together in groups, so that several types of measurement can be made from the same position, which simplifies analysis of the measures data. Further, many groups of receivers are advantageously arranged, particularly on the seabed, to provide several sets of measurements and good positional accuracy. The receivers generate advantageously electrical, acoustic, radio, electromagnetic or optical signal that are delivered in the form of raw data or processed data via cable or by other means to a surface position, preferably readable and processable in real-time. In the well-bore where the EPD device is used, receivers are preferably arranged in pairs, for example close to each other along a drill string and in addition diametrically opposite about a drill string, for easier to identify and remove unwanted signals, and determining the position of interesting reflexes or signals. The measurement devices measure strings of data over time at a frequency of measurement adapted relative to the frequency of the generated waves.

The assembly according to the invention preferably comprises a device coupled to the receivers for recording, storage and processing of data from the receivers connected to the EPD device or readable for an operator of the EPD device, for control of the electro pulse drilling based on measured and/or processed data, either manually or automatically.

The assembly according to the invention preferably comprises an EPD device with adjustable effect, so that the plasma generation selectable can be provided either in a drilling fluid ahead of the drill bit, or into or on a formation surface in front of the drill bit. This is of significance not only for the drilling process and the control thereof, but also for the generation of different types of data. There are reasons to expect that plasma channel formation in or on the formation will give different electromagnetic and acoustic signature than plasma channel formation in a drilling fluid. The plasma channel formation in a drilling fluid gives a pressure wave and an electromagnetic wave which because of reflection at the interface to the formation are assumed to have lower penetration into the formation, and a different content of shear and transverse components for the generated wave fields, than plasma channel formation into (and possibly onto) the formation. Further, the output effect for plasma channel formation in a drilling fluid will be lower, and the physical mechanism for the way in which the formation is fragmented will be different.

The assembly according to the invention preferably comprises a devise for electro pulse drilling with at least three electrodes for charging to high-voltage (charging electrodes) and subsequent discharging, arranged angularly separate within the circumference, at least one electrode coupled to ground, as the electrodes are arranged in a drilling face of a drilling bit, with insulation between electrodes, with individually switch-able connection of charging electrodes to an effectc-selectable high-voltage source. With at least three charging electrodes, preferably arranged evenly around the circumference, and with a selectable effect for the high-voltage source that can be controlled to provide plasma channel formation either into or onto the formation or within a drilling fluid, both improved control of the device for electro pulse drilling and generation of different types of acoustic and electromagnetic signals are achieved. The frequency of the generated wave field can be controlled by the switching.

The invention also provides a method for electro pulse drilling and logging, comprising introducing a device for electro pulse drilling in a well-bore, either in the end of a drill string or in the end of a cable or a coiled tubing, distinguished by electro pulse drilling the formation while simultaneously generating electromagnetic and acoustic signals; to receive acoustic signals with at least one device for receiving such signals, to receive electromagnetic signals with at least one device to receive such signals, and to use the received data, either directly or in processed form, to control the electro pulse drilling.

Eventually, the invention provides a device for electro pulse drilling, distinguished in that it comprises at least three electrodes for charging to high-voltage (charging electrodes) and subsequent discharging, arranged angularly in separated sectors within the circumference, and at least one electrode coupled to ground, the electrodes being arranged in a drilling face in a drilling bit, with insulation between electrodes, with individual switch-able coupling of charging electrodes to a high-voltage source for which the effect can be selected.

The present invention has benefits by the source for signals for logging simultaneously being the device for drilling, and the generated signals travel a shorter way than if they were generated at the surface, which provides lower damping and less occurrence of disturbing signals. Further, from one source independent signal can be provided in the form of acoustic and electromagnetic signals, and the electromagnetic and acoustic signals can be generated by different operating parameters and provide independent sets of measurements. Thereby, at a relative low cost a large quantity of data of identical and/or independent measurements can be provided, which provides data of good statistical significance. It is possible to work the invention by using only previously known equipment.

BRIEF DESCRIPTION OF THE DRAWINGS

The present invention is illustrated with three figures, more specifically

DETAILED DESCRIPTION OF THE INVENTION

Figure 1:
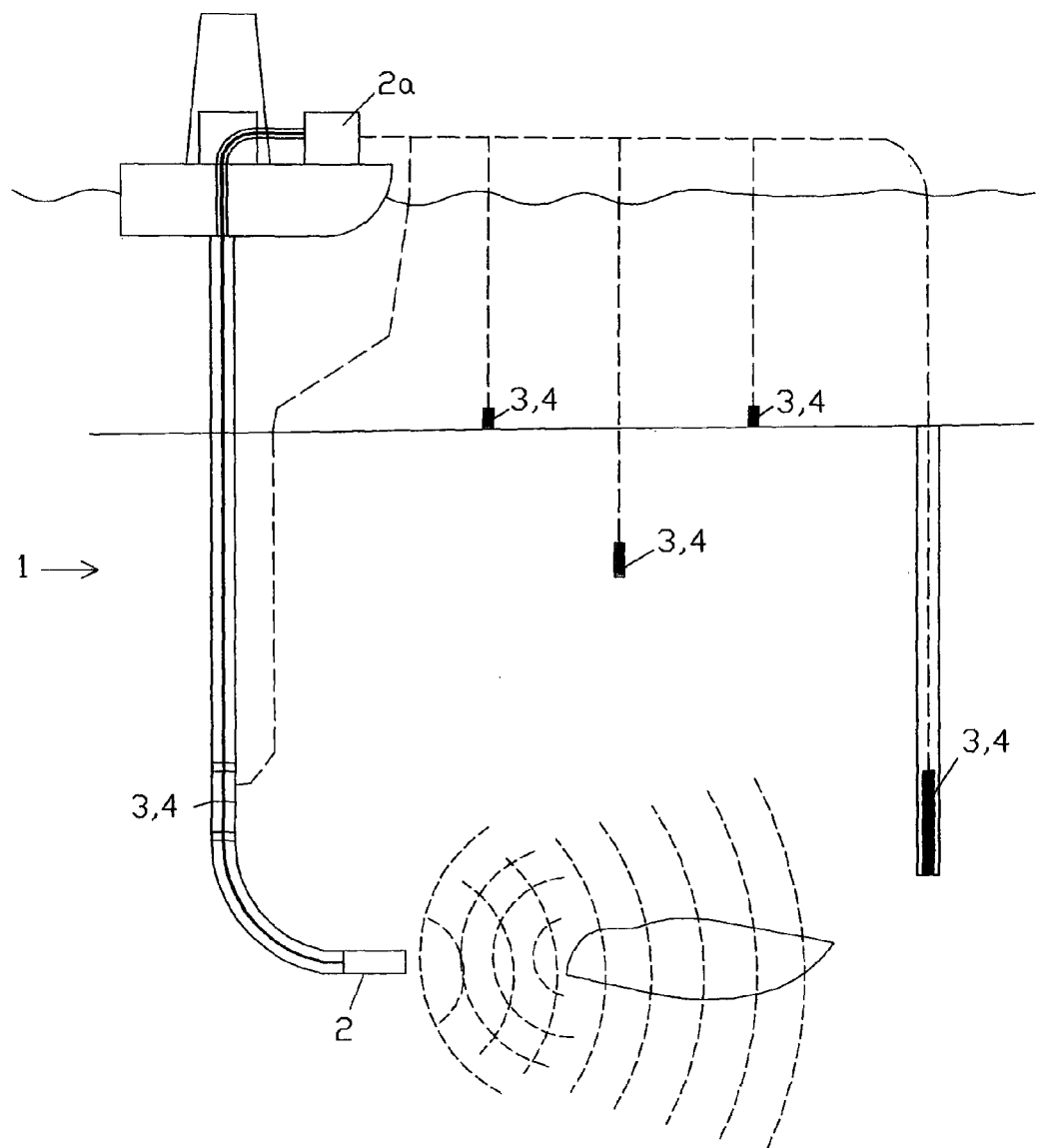
FIG. 1 illustrates an assembly according to the invention.

FIG. 1 illustrates an assembly 1 according to the invention, comprising a device 2 for electro pulse drilling (EPD device), at least one device 3 to receive acoustic signals generated by the EPD device, and at least one device 4 to receive electromagnetic signals generated by the EPD device. The devices 3, 4 to receive acoustic and electromagnetic signals, respectively, are operatively coupled to a unit 2a that receives and processes the signals, for use either manually or automatically to control the electro pulse drilling based on the measured data. Thereby the electro pulse drilling can be controlled to hit and penetrate a hydrocarbon reservoir, as the measured data can provide information on the location of the drill relative to said reservoir. To achieve the best functionality it is required with an EPD device that is particularly feasible to provide measurement data of sufficient quality to delimit and determine a hydrocarbon reservoir. Such EPD device is provided with the invention and is illustrated on the FIGS. 2A and 2B.

Figure 2A:
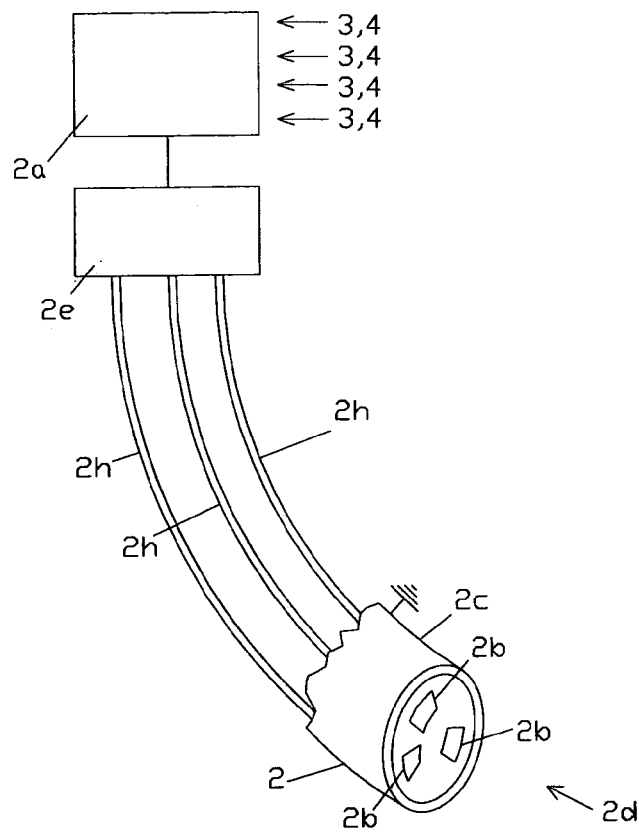
FIGS. 2A and 2B illustrate the device for electro pulse drilling according to the invention.
Figure 2B:
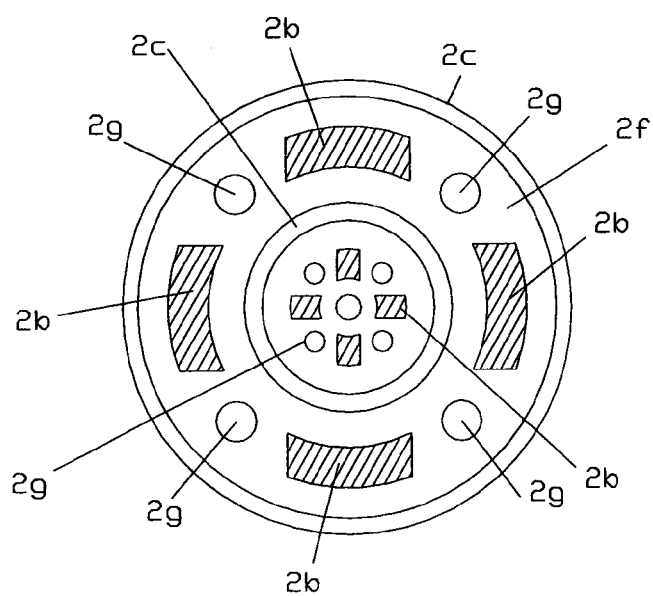

More specifically, FIG. 2A illustrates a device 2 for electro pulse drilling, comprising three electrodes 2B for charging to a high-voltage (charging electrodes) and subsequent discharging, arranged in angularly separated sectors within the circumference and at least one electrode 2c coupled to ground, the electrodes being arranged in a drilling face 2d of a drill bit, with insulation between electrodes, with individually switch-able coupling of charging electrodes to a effect-adjustable high-voltage source 2e. Three charging electrodes 2b are illustrated, arranged 120° separated within the circumference of the drilling face 2d. This is sufficient to be able to focus the electro pulse drilling in any direction, by alternately charging charging-electrodes to have the electro pulse drill deviating in the desired angle. However, to increase the diameter of the well-bore and drilling face area, and steer-ability, it can be preferable with four charging electrodes or more, arranged within the circumference of the drilling face, as illustrated on FIG. 2B. The drill bit for electro pulse drilling illustrated on FIG. 2B comprises in total 8 charging electrodes and two concentric grounded electrodes. The drilling face also comprises insulation 2f between the electrodes, and openings 2g for circulation of drilling fluid. The electrodes are coupled with pulse-forming lines 2h to an electric supply 2e, which again is coupled to a unit 2a for receival and processing of data from receivers for electromagnetic and acoustic signals generated by the EPD device, as apparent from FIG. 2A. The figures are not drawn to scale and all reference signs are not introduced, to improve clarity. The electric supply 2e can deliver charging that provides plasma channel forming only in or on the formation and charging that provides plasma channel formation only into the drilling fluid ahead of the drill bit, and be adjusted for aimed focusing of the drilling effect. Said focusing is achieved by choosing charging electrodes or sections or groups of charging electrodes so that the drilling effect is angularly focused in the desired direction, by the electro pulse drill not drilling at even rate over the drilling face. For example when drilling in sandstone, and with 5 cm between the electrodes, a charging up to at least 250 kV is required for plasma channel formation to take place into or on the sandstone instead of into a drilling fluid of water, according to FIG. 6 of Patent Publication WO 03/069110. By focused drilling in sandstone a charging is therefore elected to be below 250 kV, and electrodes providing desired deviation of the drilling direction. In the introductorily described patent application WO 03/069110, further guidance is found on appropriate operating parameters, refer in particular to the FIGS. 6-8 and accompanying text in the description. The electric supply can conveniently be an adapted Marx generator. The pulse-forming lines can conveniently be Blumlein pulse-forming lines. The charge voltage can preferably be adjustable from 0 to at least 300 kV, most preferably so that plasma channel formation can take place in any type of formation that is drilled through at the actual distance between the electrodes. The insulation between the electrodes is conveniently in the form of a ceramic material. Further guidance on pulse-forming lines, electric supply, charge voltage and effect of electrode separation can be found in Patent Publications WO 03/069110 and U.S. Pat. No. 4,741,405.

Figure 3:
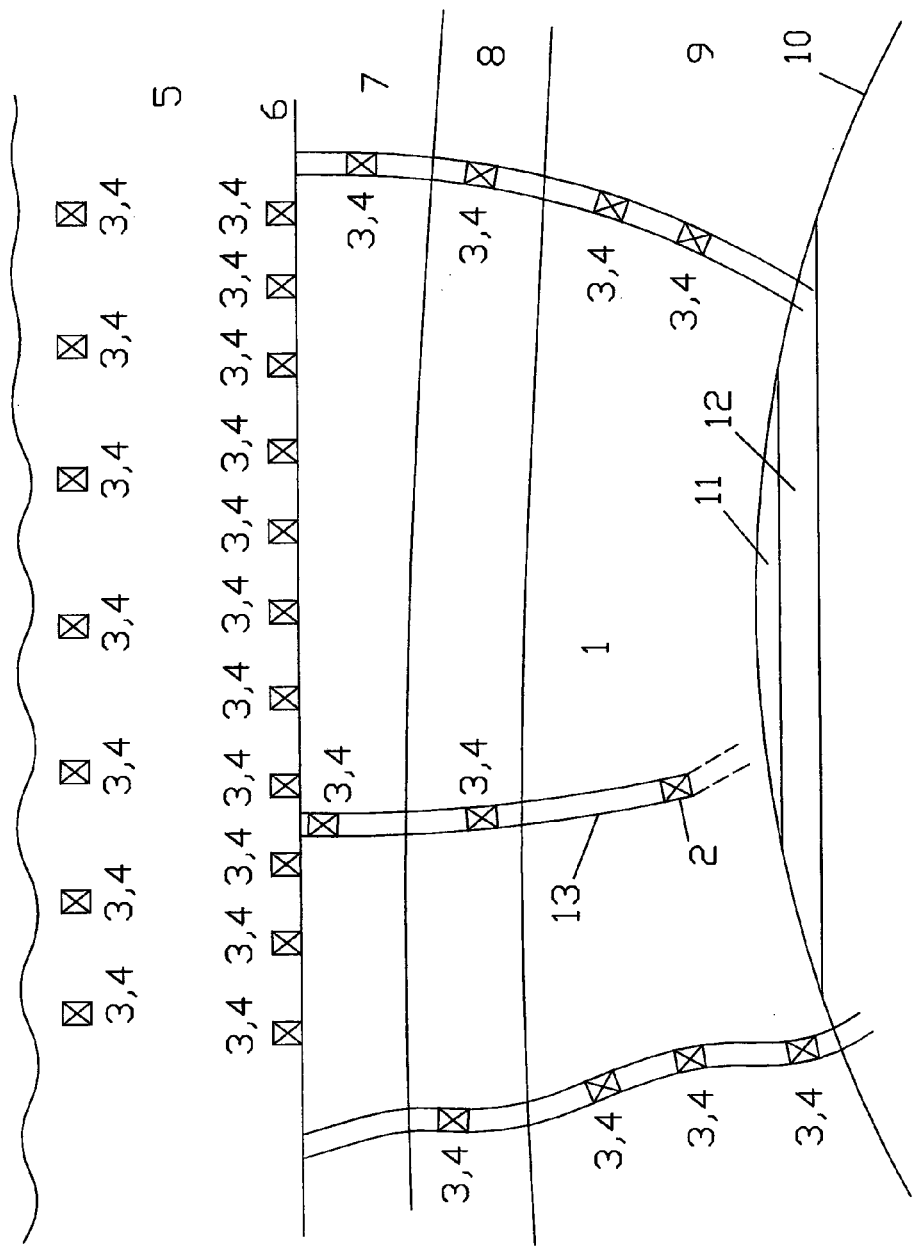
FIG. 3 is a cross-section illustrating arrangement of receiving devices and the EPD device of the assembly and the method according to the invention.

FIG. 3 is a cross-section illustrating the arrangement of receiving devices and the EPD device of the assembly and the method according to the invention. A substantial number of receiving devices 3, 4 are illustrated, which receiving devices in general are a group of receiving devices chosen amongst acoustic and electromagnetic receiving device. More specifically, the receiving devices 3, 4 are arranged in the sea 5 above a seabed 6, on said seabed 6, in geological strata 7, 8, and 9 downward from the seabed in separate well-bores and in the well-bore 13 where the EPD device is used. Under a cap 10 gas 11 and oil 12 are found. With the EPD device 2 the well-bore 13 is drilled further so that the well-bore 13 hits said gas and oil, for subsequently to produce the gas and oil through the well-bore.

The EPD device will during operation generate acoustic and electromagnetic waves, of frequency determined by the switching and discharging frequency, and energy and component contents dependent on the discharging effect and modus for plasma channel formation (in a drilling fluid, or in or on a formation). More specifically the acoustic waves will comprise both pressure and shear components, and the electromagnetic waves will comprise TE and TM components. The EPD device will initially send out a short response with random shape limited in time and as a continuous frequency spectrum of acoustic and electromagnetic waves, which results in time-domain data. Transmission of long periodic signals in time from the EPD device results in principle in discontinuous frequency spectra, resulting in frequency-domain data. In principle it is the objective to use all types of data that can be generated by the EPD device, both time-domain data and frequency-domain data.

The receivers for acoustic and electromagnetic signals will receive a comprehensive set of signals with direct, reflected, refracted, deviated and excited components. Amongst the signals it will in particular be sought for components giving information suitable to delimit and determine the properties of interesting zones in the reservoir. Acoustic shear components, formed directly by the EPD device or by reflections, will to a limited extent propagate through fluid containing reservoirs, because fluids do not transfer shear waves. Fluid-containing zones, in particular zones containing oil and gas, will typically have a resistivity that deviates from the surrounding areas and the overburden. Electromagnetic TM components can, dependent on the angle of incidence, excite a channeled wave modus in a layer of high resistivity, as described in Patent Publication WO 02/14906 A1. Advantageously, many receivers are used, with different placements to provide good accuracy for determining positions by path-time analysis. The transmitter (EPD device) and receivers must be synchronized in real-time, for example with GPS, and the transfer function of the sender and the receivers must be measured or estimated. For receivers that store the signals preliminarily, time must be logged together with received data, in order to correct any time deviation. Further, measurements may advantageously be taken up over a drilling interval, in order to have components formed that are particularly feasible for determining the properties of the interesting zones. Advantageously, many measurements are taken to obtain data that can be processed by averaging and filtering away noise and undesired signal components as appropriate. Analysis and processing of the measured data is a comprehensive and challenging operation. Data can be analyzed by using existing techniques, as for example described in the Patent Publications WO 02/14906 A1 and WO 2004/083898 A1, and techniques being developed.

When drilling a well it can be preferable to use conventional drilling technology for the upper parts of the well bore, having larger diameter than achievable with electro pulse drilling, but shifting to electro pulse drilling when the well-bore is close to an identified reservoir. To take up forces generated by the EPD device, and to ensure good access deeply into deviating well-bores, the EPD device can be arranged as a bottom hole assembly at the end of a drill string.

The invention claimed is:

1. An assembly for drilling and logging, comprising:
    a device for electro pulse drilling (EPD device) configured to generate acoustic signals and electromagnetic signals;
    at least one device configured to receive the acoustic signals generated by drilling using the EPD device; and
    at least one device configured to receive the electromagnetic signals generated by the drilling using the EPD device, and further configured to receive electromagnetic and seismic waves from electrode discharge and plasma formation.

2. An assembly according to claim 1,
    further comprising acoustic receivers configured to measure three displacement vectors and one pressure component, the receivers being configured to be arranged in one or more positions chosen amongst: on a seabed, on a ground surface, in water above the seabed, in one or more separate well-bores, in the well-bore where the EPD device is used.

3. An assembly according to claim 1,
    further comprising electromagnetic receivers, configured to be arranged in one or more positions chosen amongst: on a seabed, on a ground surface, in water above the seabed, in one or more separate well-bores, in the well-bore where the EPD device is used.

4. An assembly according to claim 1,
    further comprising silver-silver-chloride dipole electrodes and coils with ferromagnetic core configured to measure electric and magnetic signals respectively, on the surface or a seabed.

5. An assembly according to claim 1,
    further comprising loop antennas configured to measure electromagnetic signals in a well-bore.

6. An assembly according to claim 1,
    further comprising a device coupled to the receivers for recording, storing and processing of the data from the receivers, coupled to the EPD device or readable for an operator for the EPD device, for control of the electro pulse drilling based on the measures and/or processed data, either manually or automatically.

7. An assembly according to claim 1,
    wherein the EPD device includes electrodes configured to be arranged so as to be capable of being coupled to an effect adjustable high-voltage supply to provide an adjustable charge voltage for subsequent discharge via the electrodes, so that plasma formation can thereby be provided selectably either in a drilling fluid ahead of a drilling bit, or into or onto a formation face ahead of the drilling bit.

8. An assembly according to claim 1,
    wherein the device for electro pulse drilling includes at least three electrodes for charging to a high-voltage (charging electrodes) and subsequent discharging, arranged angularly separate within a circumference, and with at least one electrode coupled to ground, the electrodes being configured to be arranged in a drilling face of a drill-bit, with insulation between the electrodes, with individually switch-able coupling of the charging electrodes to an effect-adjustable electric high-voltage supply.

9. A method for electro pulse drilling and logging, comprising:
    bringing a device for electro pulse drilling into a well-bore, in at least one of an end of a drill string and an end of a cable or coiled tubing,
    electro pulse drilling a formation thereby simultaneously generating electromagnetic and acoustic signals;
    receiving the acoustic signals with at least one device to receive such signals;
    receiving the electromagnetic signals so generated with at least one device to receive such signals; and
    using the received data, either directly or in processed form, to control the electro pulse drilling,
    wherein the receiving the electromagnetic signals so generated with at least one device to receive such signals includes receiving electromagnetic and seismic waves from electrode discharge and plasma formation.

10. A device for electro pulse drilling, comprising: at least three electrodes for charging to a high voltage (charging electrodes) and subsequent discharging, arranged in angularly separated sectors within a circumference, and at least one electrode coupled to ground, the electrodes being configured to be arranged in a drilling face of a drill bit, with insulation between the electrodes, and being arranged so as to be coupled to an effect-adjustable high-voltage supply to provide an adjustable charge voltage for subsequent discharge via the electrodes, and selectably operable in a first mode in which plasma formation is provided within drilling fluid ahead of a drilling bit and a second mode in which plasma formation is provided into or onto a formation face ahead of the drilling bit.

11. A device according to claim 10, wherein the electrodes are further arranged with individually switch-able coupling of the charging electrodes to the effect-adjustable electric high-voltage supply.

12. A device according to claim 10, wherein the charge voltage is adjustable over a range with an end member voltage value of to at least 300 kV.

13. A device according to claim 10, wherein the charge voltage is adjustable over a range with an end member voltage value of at least 250 kV.

14. A device for electro pulse drilling, comprising:
    a charging electrode configured to charge to high voltage and subsequent discharging;
    a ground electrode coupled to ground;
    wherein the electrodes are configured to be disposed in a part of a drill bit, and being arranged to be coupled to an effect-adjustable high-voltage supply to provide an adjustable charge voltage for subsequent discharge via the electrodes, and further selectably operable in a first mode in which plasma formation is provided within drilling fluid ahead of a drilling bit and a second mode in which plasma formation is provided into or onto a formation face ahead of the drilling bit.

15. A device according to claim 14, wherein the charge voltage is adjustable over a range with an end member voltage value of at least 250 kV.

16. An assembly for drilling and logging, comprising:
    a device for electro pulse drilling (EPD device) configured to provide electrode discharge and plasma formation to generate seismic and electromagnetic waves therefrom;

at least one device configured to receive at least one component of the seismic waves generated by the electrode discharge and plasma formation by drilling using the EPD device; and at least one device configured to receive at least one component of the electromagnetic waves generated by the electrode discharge and plasma formation by the drilling using the EPD device.

17. An assembly according to claim 16, wherein the EPD device includes electrodes configured to be arranged so as to be capable of being coupled to an effect adjustable high-voltage supply to provide an adjustable charge voltage for subsequent discharge via the electrodes, so that plasma formation can thereby be provided selectably either in a drilling fluid ahead of a drilling bit, or into or onto a formation face ahead of the drilling bit.

18. An assembly according to claim 16, wherein the device for electro pulse drilling includes at least three electrodes for charging to a high-voltage (charging electrodes) and subsequent discharging, arranged angularly separate within a circumference, and with at least one electrode coupled to ground, the electrodes being configured to be arranged in a drilling face of a drill-bit, with insulation between the electrodes, with individually switch-able coupling of the charging electrodes to an effect-adjustable electric high-voltage supply.

19. A method for electro pulse drilling and logging, comprising:

bringing a device for electro pulse drilling into a well-bore, in at least one of an end of a drill string and an end of a cable or coiled tubing, electro pulse drilling a formation thereby simultaneously generating electrode discharge and plasma formation and electromagnetic and acoustic waves therefrom;

receiving seismic waves from the electrode discharge and plasma formation with at least one device to receive such waves, to produce received seismic data;

receiving electromagnetic waves from said electrode discharge and plasma formation with at least one device to receive such waves, to produce received electromagnetic data; and using the received seismic and electromagnetic data, either directly or in processed form, to control the electro pulse drilling.

20. An assembly for drilling and logging, comprising:

a device for electro pulse drilling (EPD device) configured to generate acoustic signals and electromagnetic signals;

at least one device configured to receive the acoustic signals generated by drilling using the EPD device; and at least one device configured to receive the electromagnetic signals generated by the drilling using the EPD device;

wherein said device configured to receive the electromagnetic signals and said device configured to receive the acoustic signals are arranged to receive electromagnetic and seismic waves from the electrode discharge and plasma formation.

21. An assembly as claimed in claim 20, wherein the at least one device configured to receive the electromagnetic signals generated by the EPD device is configured to receive electromagnetic and seismic waves from electrode discharge and plasma formation.

22. An assembly as claimed in claim 20, wherein the at least one device configured to receive the acoustic signals generated by the EPD device is configured to receive electromagnetic and seismic waves from electrode discharge and plasma formation.

23. A method for electro pulse drilling and logging, comprising:

bringing a device for electro pulse drilling into a well-bore, in at least one of an end of a drill string and an end of a cable or coiled tubing, electro pulse drilling a formation thereby simultaneously generating electromagnetic and acoustic signals;

receiving the acoustic signals with at least one device to receive such signals;

receiving the electromagnetic signals so generated with at least one device to receive such signals; and using the received data, either directly or in processed form, to control the electro pulse drilling, wherein said receiving the acoustic signals and said receiving the electromagnetic signals include receiving electromagnetic and seismic waves from electrode discharge and plasma formation.

* * * * *